(12) United States Patent
Kihira

(10) Patent No.: US 7,094,970 B2
(45) Date of Patent: Aug. 22, 2006

(54) SHIELDED WIRE HARNESS

(75) Inventor: Souji Kihira, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 259 days.

(21) Appl. No.: 10/713,105

(22) Filed: Nov. 17, 2003

(65) Prior Publication Data

US 2004/0099427 A1  May 27, 2004

(30) Foreign Application Priority Data

Nov. 20, 2002  (JP)  ............... 2002-336931

(51) Int. Cl.
  *H02G 15/02*  (2006.01)
(52) U.S. Cl. ..................... 174/74 R; 174/78
(58) Field of Classification Search .......... 174/36, 174/74 R, 78, 79, 75 C
  See application file for complete search history.

(56) References Cited

U.S. PATENT DOCUMENTS

| | | | | |
|---|---|---|---|---|
| 1,966,929 A | * | 7/1934 | Kellems | ............ 403/373 |
| 2,939,905 A | * | 6/1960 | Canfield | ............ 174/71 R |
| 3,280,246 A | * | 10/1966 | Lawson et al. | ............ 174/88 C |
| 3,777,049 A | * | 12/1973 | Gillemot et al. | ............ 174/78 |
| 3,990,765 A | * | 11/1976 | Hill | ............ 439/610 |
| 4,896,000 A | * | 1/1990 | Procter et al. | ............ 174/74 R |
| 5,015,805 A | * | 5/1991 | Beckloff et al. | ............ 174/75 C |
| 5,244,417 A | * | 9/1993 | Perretta et al. | ............ 439/610 |
| 5,315,063 A | * | 5/1994 | Auclair | ............ 174/78 |
| 5,473,117 A | * | 12/1995 | Morgan et al. | ............ 174/78 |
| 5,691,506 A | * | 11/1997 | Miyazaki et al. | ............ 174/65 R |
| 6,042,396 A | * | 3/2000 | Endo et al. | ............ 439/98 |
| 6,085,416 A | * | 7/2000 | Ikeda | ............ 29/864 |
| 6,358,069 B1 | * | 3/2002 | Yoshioka et al. | ............ 439/108 |
| 6,583,352 B1 | * | 6/2003 | Fukushima et al. | ............ 174/35 R |
| 6,781,059 B1 | * | 8/2004 | Mizutani | ............ 174/75 C |
| 6,815,610 B1 | * | 11/2004 | Kuboshima et al. | ............ 174/35 C |

FOREIGN PATENT DOCUMENTS

JP  A 11-26093  1/1999

* cited by examiner

*Primary Examiner*—William H. Mayo, III
(74) *Attorney, Agent, or Firm*—Oliff & Berridge, PLC

(57) ABSTRACT

A tube-shaped shielding member is configured to enclose a plurality of wires collectively. The tube-shaped shielding member includes: a main shield portion made of a metal pipe; and a sub-shield portion formed shorter than the main shield portion and configured to be deformable, to thereby protect the wires from objects such as bounced stones.

6 Claims, 4 Drawing Sheets

SHIELDED WIRE HARNESS

BACKGROUND OF THE INVENTION

1. Field of the Invention

The present invention relates to a shielded wire harness.

2. Description of the Related Art

For connecting machines such as an inverter unit and a motor in an electric vehicle, a shielded wire harness is used. As a wire harness of this type, there is known a wire harness structured such that wire-side terminals are fixed to the end portions of the conductors of shielded wires, the wire-side terminals are connected to equipment-side terminals disposed within a shield case of equipment, and the shield layers of the shielded wires are connected to the shield case through conductive connecting members (see JP-A-11-026093).

However, in the wire harness, an operation to insert the wire-side terminals into the shield case and an operation to connect the connecting members to the shield case must be repeated respectively the same number of times as the number of terminal poles (that is, the number of shielded wires), which takes much time and labor.

In view of the above, there is proposed a wire harness structured in the following manner: that is, there are used wires including no shield layer; and, the wires are collectively covered with a cylindrical-shaped flexible shielding member made of braided wires obtained by braiding metal fine wires together. According to the wire harness of a collective shield type, an operation to connect the shielding portions (shielding members) to the shield case may be executed only once regardless of the number of wires, which can enhance the operation efficiency of the wire harness.

The above-mentioned wire harness, which is structured such that more than one wire is covered with a shielding member, in some cases, is used in such a manner that it is exposed outside the vehicle body. In this case, in order to protect the wire harness from bounced stones and the like, there is employed a structure in which the wires and shielding member are stored in an armored case made of high-strength material such as metal.

However, to provide the armored case separately from the wire harness causes a problem that not only the number of parts and the number of assembling steps increase but also the cost of the apparatus increases.

SUMMARY OF THE INVENTION

It is therefore an object of the invention to provide a wire harness which can prevent the interference of objects colliding thereto without increasing the number of parts.

In order to achieve the object, according to one aspect of the invention, there is provided a shielded wire harness including: a plurality of wires; a plurality of wire-side terminals respectively connected to an end portions of the wires, and configured to be connected to respective terminals disposed within a shield case of an equipment; and a shielding member formed in a tube shape and configured to enclose the plurality of wires collectively and to be connected to the shield case, wherein the shielding member includes a main shield portion made of a metal pipe, and a sub-shield portion formed shorter than the main shield portion and configured to be deformable.

BRIEF DESCRIPTION OF THE DRAWINGS

The objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Figure 1:
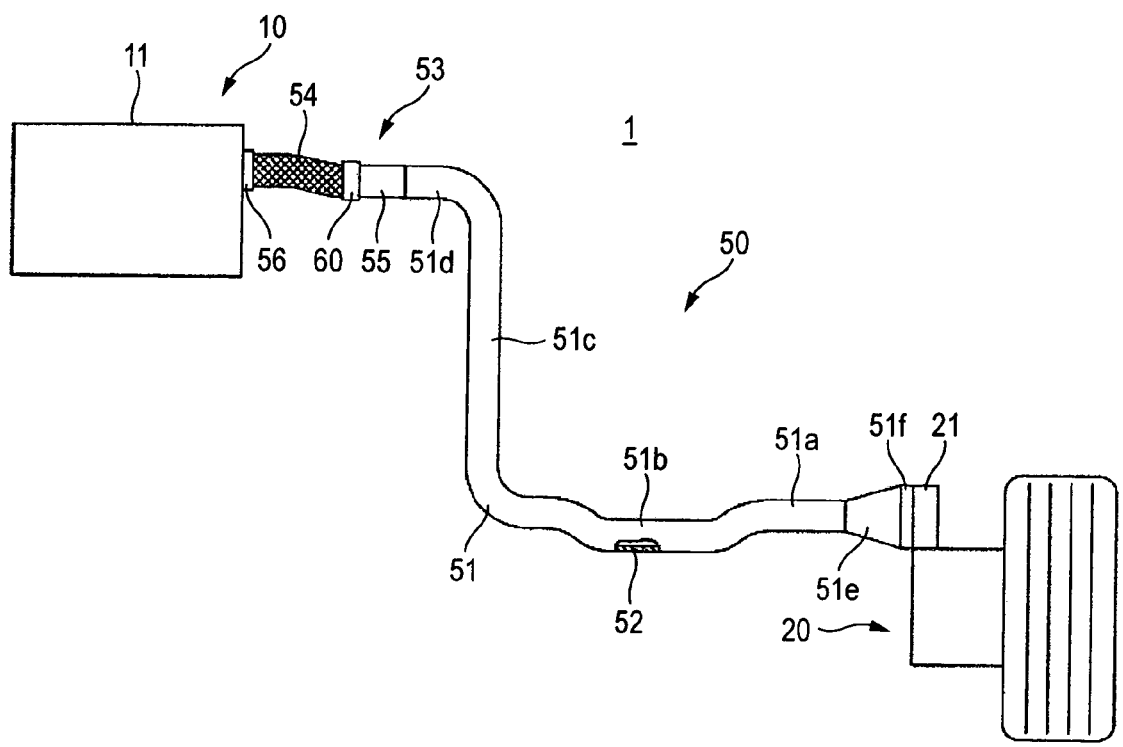
FIG. 1 is a schematic side view, showing a state in which a wire harness according to an embodiment of the invention is interposed between two pieces of equipment.
Figure 2:
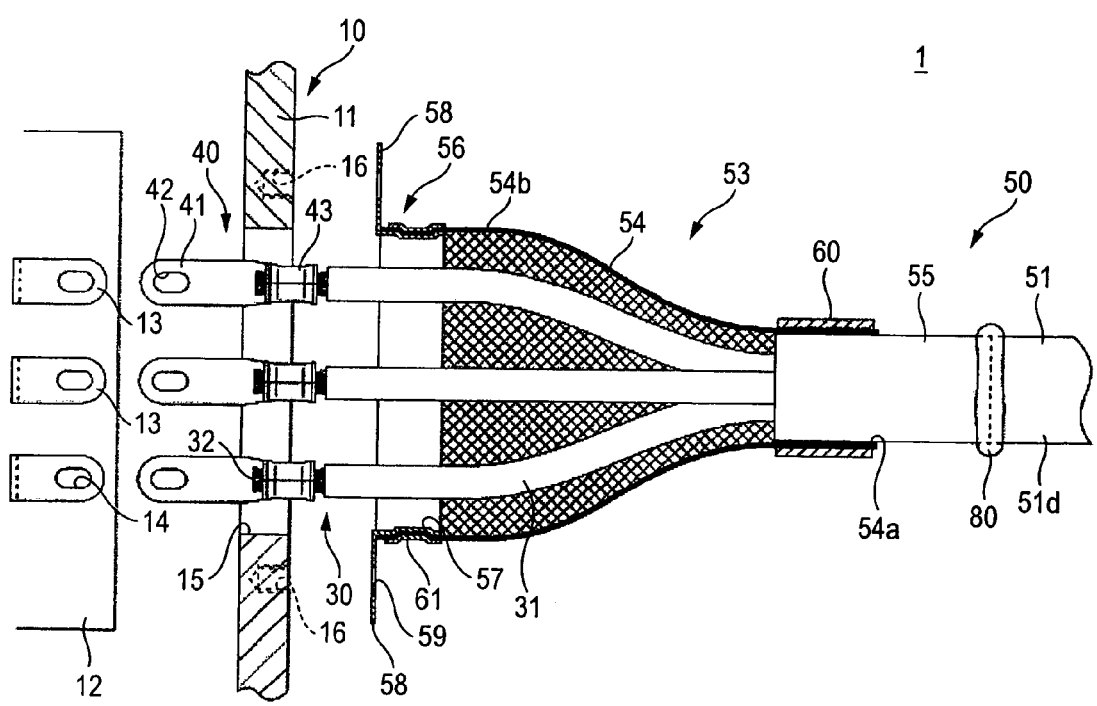
FIG. 2 is a horizontal sectional view, showing a process for connecting the wire harness to an inverter unit.
Figure 3:
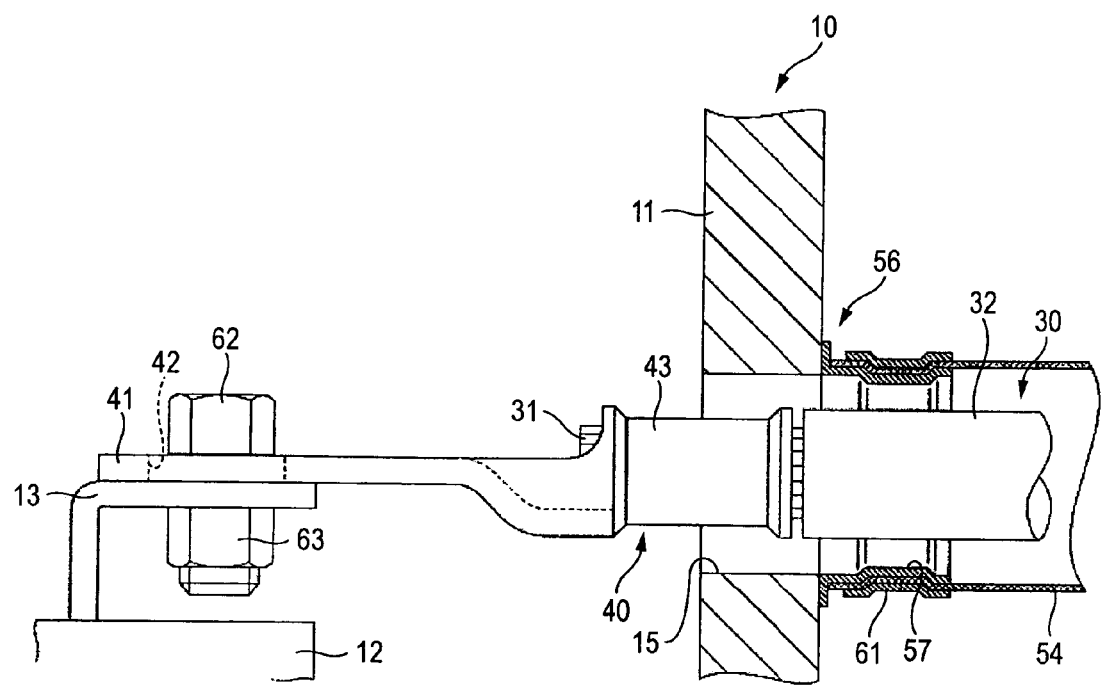
FIG. 3 is a longitudinal sectional view, showing a state in which the wire harness is connected to the inverter unit.
Figure 4:
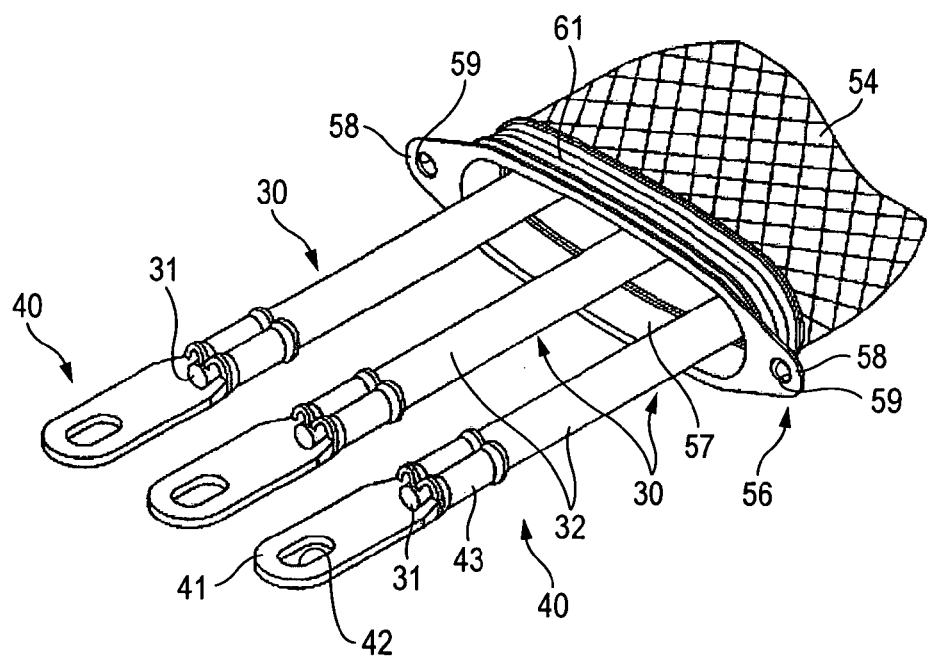
FIG. 4 is a perspective view of an inverter-unit-side end portion of the wire harness and FIG. 5 is a perspective view of the motor-side end portion of the wire harness.
Figure 5:
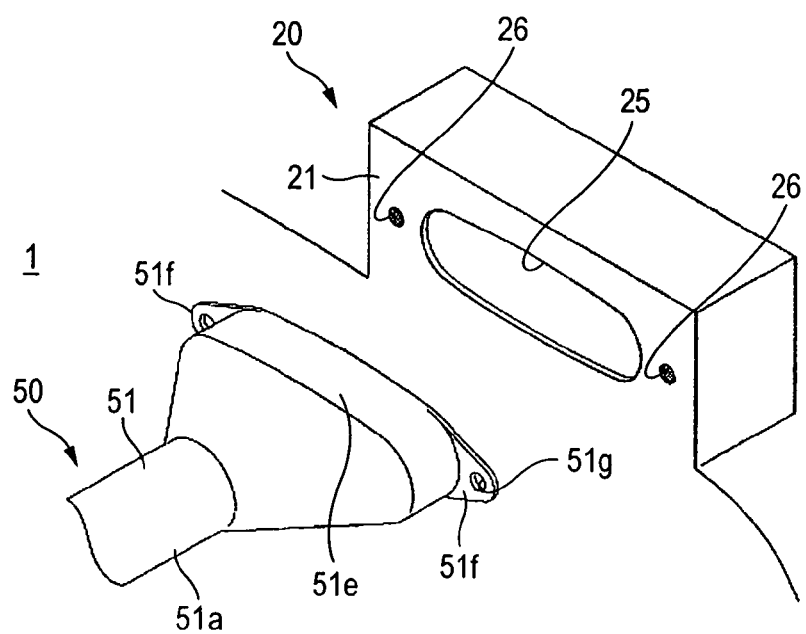

A shielded wire harness 1 according to an embodiment of the present invention, described with reference to FIGS. 1 through 5, is used for connecting an inverter unit 10 (as a first equipment) to a motor 20 (as a second equipment) respectively disposed in an electric vehicle.

The inverter unit 10 is disposed in an engine room and is structured such that an inverter 12 and three equipment-side terminals 13 extended from the inverter 12 are stored in a conductive shield case 11. Each of the equipment-side terminals 13 is formed as a thick plate shape referred to as a bus bar and includes a bolt hole 14 which penetrates through the terminal in the vertical direction thereof. In the side wall of the shield case 11, there are formed three substantially-elliptic-shaped oblong mounting holes 15 so as to correspond to the three equipment-side terminals 13, and also there are formed a pair of female screw holes 16 which are situated on the two right and left sides of the mounting holes 15.

The motor 20 is disposed on a wheel of the electric vehicle and is structured such that a coil (not shown) and equipment-side terminals (not shown) connected to the coil are stored in a conductive shield case 21. Each of the equipment-side terminals, similarly to the equipment-side terminals of the inverter unit 10, is formed as a thick plate shape referred to as a bus bar and includes a bolt hole 14 which penetrates through the terminal in the vertical direction thereof. In the side wall of the shield case 21, there are formed three mounting holes 15 shaped in oblong so as to correspond to the three equipment-side terminals, and also there are formed a pair of female screw holes 26 which are situated on the two right and left sides of the mounting holes 25.

Next, description will be given below of the wire harness 1 according to the embodiment.

The wire harness 1 includes three wires 30, wire-side terminals 40 fixedly secured to the two end portions of each of the three wires 30, and a tube-shaped shielding member 50 (bracket shield) enclosing the three wires 30 collectively.

Each of the three wires 30 include a conductor 31 and an insulation cover 32 enclosing the outer periphery of the conductor 31 and, differently from a shielded wire, no shield layer is arranged in the wire 30.

Each of the wire-side terminals 40 is made of a thick metal plane member; and, the substantially-front-half section of each of the wire-side terminals 40 provides an equipment connecting portion 41 which is formed in a substantially-flat-plate shape and includes a bolt hole 42 penetrating vertically through the equipment connecting portion 41, while the substantially-rear-half section provides an open-barrel-shaped wire pressure connect portion 43. Specifically, the conductor 31 of the wire 30 is pressure connected to the wire pressure connect portion 43 in a conductible manner.

The shielding member 50 includes: a main shield portion 51 which is long in dimension, conductive, and extends almost the entire length of the shielding member 50; and a sub-shield portion 53 as an inverter-unit-side end portion of the shielding member 50, and is shorter than the main shield portion 51.

The main shield portion 51 includes a cylindrical-shaped pipe made of metal (e.g. iron, aluminum, copper, or stainless steel), and has an inside diameter that allows the three wires 30 to be inserted through the main shield portion 51. The main shield portion 51 is bent along the wiring route of the wire harness 1. That is, the portion of the main shield portion 51 situated adjacent to the motor 20 provides a long horizontal portion 51a extending substantially in the horizontal direction, while part of the long horizontal portion 51a is formed low in position. The low portion is a lowest portion 51b that is lowest in the wiring route of the wire harness 1 and, in the lowest portion 51b, there is formed a drain hole 52 which is open on the lower surface side thereof. A rising portion 51c is formed so as to extend upwardly from the end portion of the long horizontal portion 51a of the main shield portion 51 on the opposite side to the motor 20 and, from the upper end portion of the rising portion 51c, there is formed a short horizontal portion 51d in such a manner that it extends substantially horizontally toward the inverter unit 10. Also, a motor-side end portion of the long horizontal portion 51a provides a substantially elliptic portion 51e which spreads in a tapered shape in the right and left direction. In the open edge portion of the substantially elliptic portion 51e, there are formed a pair of mounting portions 51f which respectively project in the right and left directions and, in each of the mounting portions 51f, there is formed a bolt hole 51g. On the other hand, the inverter-unit-side end portion of the short horizontal portion 51d is formed in a circular shape.

The sub-shield portion 53 includes a tube-shaped braided member 54, a connecting pipe 55 and a shield shell 56.

The tube-shaped braided member 54 is formed by braiding together conductive metal thin lines made of metal (e.g. copper) in a mesh-like manner; and, one end portion (main-shield-portion-side) of the tube-shaped braided member 54 is formed as a small diameter portion 54a having a diameter dimension necessary for insertion of the three wires 30 and the wire-side terminals 40 connected to the wires 30, while the other (inverter-unit-side) end portion thereof is formed as a substantially-elliptic-shaped large diameter portion 54b which is able to store the three wire-side terminals 40 in such a manner that they are arranged spaced apart from each other in the lateral direction thereof.

The connecting pipe 55 is made of metal (e.g. iron, aluminum, copper or stainless steel) and is formed in a cylindrical shape having a dimension substantially equal to the short horizontal portion 51d of the main shield portion 51. The connecting pipe 55 has a length necessary and sufficient to connect together the tube-shaped braided member 54 and the main shield portion 51, while the length dimension thereof is much shorter than that of the main shield portion 51.

The shield shell 56, which is an integral part formed by deep drawing plate member made of metal (e.g. iron or copper), includes a tube portion 57 having a substantially elliptic-shaped oblong (in the right and left direction) shape as a whole and two plate-shaped mounting portions 58 respectively projecting outwardly in the right and left directions from the two right and left end portions of the front edge (inverter-unit-side end edge) of the tube portion 57, while each of the mounting portions 58 includes a bolt hole 59. The front surfaces of the mounting portions 58 are contacted with the outer wall surface of the shield case 11 in a surface abutting manner.

Also, the rear end portion (the end portion on the opposite side to the inverter unit 10) of the connecting pipe 55 is connected to the main shield portion 51. That is, the rear end face of the connecting pipe 55 is butted against the front end face of the short horizontal portion 51d of the main shield portion 51, and the butted portion is conductively fixed by a weld 80. In the fixed state, the connecting pipe 55 and short horizontal portion 51d are almost coaxially continuous with each other.

The small-diameter portion 54a of the tube-shaped braided member 54 is fitted with the outer surface of the inverter-unit-side end portion of the connecting pipe 55, a calking ring 60 is fitted with the outer surface of the small-diameter portion 54a from outside, and, by calking the calking ring 60, the small-diameter portion 54a of the tube-shaped braided member 54 is conductively fixed to the front end portion (inverter-unit-side end portion) of the connecting pipe 55. Also, a tin plating treatment (not shown) is enforced on the outer peripheral surface of the connecting pipe 55, that is, on the surface thereof to be contacted with the tube-shaped braided member 54; and, the tin plating treatment can reduce the contact resistance between the connecting pipe 55 and tube-shaped braided member 54. Incidentally, in the embodiment, on the surface of the main shield portion 51 with which the tube-shaped braided member 54 is not directly contacted, there is not enforced a plating treatment for reduction of the contact resistance between them. However, an anti-corrosion plate may be enforced (for example, in case where the main shield portion 51 is made of iron, a zinc plating treatment may be enforced on the surface thereof).

The large-diameter portion 54b of the tube-shaped braided member 54 is placed on the tube portion of the shield shell 56, the calking ring 61 is fitted with the large-diameter portion 54b from the outside thereof and, by calking the calking ring 61, the large-diameter portion of the tube-shaped braided member 54 is conductively fixed to the tube portion 57 of the shield shell 56.

To connect the wire harness 1 above configured to the inverter unit 10, firstly, the three wire-side terminals 40 are respectively inserted into respective mounting holes 15 of the shield case 11 to thereby place the equipment connecting portions 41 onto the equipment-side terminals 13, and nuts 63 are respectively screwed onto respective bolts 62 penetrated through the bolt holes 14, 42 of the equipment-side terminals 13 and wire-side terminals 40 and are then tightened, thereby connecting together the two kinds of terminals 13, 40 in a conductible manner. After then, the shield shell 56 is contacted with the outer surface of the shield case 11 and, bolts (not shown) inserted into the bolt holes 59 of the shield shell 56 are screwed into the female screw holes 16 of the shield case 11 and are then tightened, so that the shield shell 56 is conductively fixed to the shield case 11.

Although not shown, the connection of the wire harness 1 and motor 20 is also executed similarly to the connection of the wire harness 1 and inverter unit 10. That is, three wire-side terminals (not shown) projected from the substantially-elliptic-shaped portion 51e forming the end portion of the long horizontal portion 51a are inserted into their associated mounting holes 25 of the shield case 21 to thereby place the equipment-side connecting portion onto equipment-side terminals (not shown), and the two kinds of terminals are then conductively connected to each other using bolts and nuts. After then, the substantially-elliptic-shaped portion 51e and mounting portion 51f of the main shield portion 51 are contacted with the outer surface of the shield case 11 and bolts (not shown) inserted into the bolt holes 51g of the mounting portion 51f are screwed into the female screw holes 26 of the shield case 21 and are tightened, so that the main shield portion 51 is conductively fixed to the shield case 21. Incidentally, the main shield portion 51 is fixed to a vehicle body (not shown) at more than one position in the intermediate portion of the wiring route of the wire harness 1.

As described above, the wire harness 1 according to the embodiment is structured such that the shielding member 50 enclosing the three wires 30 collectively comprises the main shield portion 51 composed of a metal-made pipe and the sub-shield portion 53 formed deformable because it is shorter than the main shield portion 51 and it uses the tube-shaped braided member 54. As a result, the wire harness 1 can provide the following advantages.

Since the main shield portion 51 is made of a metal-made pipe, it not only can fulfill a shield function but also can positively protect the wires 30 from objects such as bouncing stones. In this manner, because the main shield portion 51 constituting a major part of the shielding member 50 serves also as means for protecting the wires 30, the number of parts can be reduced when compared with a structure in which protect means is disposed separately from the shielding member 50.

Since the main shield portion 51 is made of a metal pipe, if the two ends of the main shield portion 51 are fixed directly to the two shield cases 11 and 21, there can be generated stresses in the fixed portions due to the vibrations thereof. However, in the embodiment, because the sub-shield portion 53 is formed flexible, it can absorb the vibrations, thereby being able to avoid the generation of the stresses in the fixed portion thereof to the shield case 11.

Also, the sub-shield portion 53 includes the tube-shaped braided member 54 and, because the tube-shaped braided member 54 is composed of metal thin lines braided together, it can be deformed flexibly. Therefore, the sub-shield portion 53 is able to cope with even a case in which the wires 30 are bent and wired with large curvature in the neighboring portion of the equipment.

The metal thin lines are generally easy to fray in the end portions of the tube-shaped braided member 54. However, according to the embodiment, in a state before the tube-shaped braided member 54 is connected to the main shield portion 51 and shield case 11, the end portions of the tube-shaped braided member 54 are fixed to the connecting pipe 55 and shield shell 56. Therefore, the metal thin lines are prevented from fraying in the end portions of the tube-shaped braided member 54.

Since the tube-shaped braided member 54 is made of metal thin lines, the contact area thereof with the connecting pipe 55 is small and thus the two parts 54 and 55 can be lowered in reliability. However, according to the embodiment, because a plating treatment for reducing the contact resistance of the connecting pipe 55 with respect to the tube-shaped braided member 54 is enforced on the connecting pipe 55, the contact reliability of the two parts 54 and 55 is high.

Moreover, the plate treatment may be enforced only on the connecting pipe 55 which is to be contacted with the tube-shaped braided member 54, and no plating is necessary on the long main shield portion 51. Therefore, it is possible to reduce the cost of the wire harness down to a low level.

In addition, in the main shield portion 51 of the shielding member 50, specifically, in the lowest portion of the wiring route of the wire harness, there is formed the drain hole 52 which is open in the substantially downward direction, thereby being able to discharge the water that collects in the interior of the shielding member 50. Due to the above configuration, it can positively prevent occurrence of an unfavorable phenomenon such as corrosion due to the existence of the water.

The present invention is not limited to the embodiments respectively discussed through the foregoing description and drawings but, for example, the following embodiments also fall within the technical scope of the invention. Also, other various changes and modifications than the following embodiments are also possible without departing from the scope of the claims.

(1) In the embodiment described above, the flexible shield portion is interposed between the shield case and main shield portion. However, according to the invention, the flexible shield portion may also be interposed between two main shield portions.

(2) In the embodiment described above, the flexible shield portion is made of braided lines. However, according to the invention, the flexible shield portion may also be formed by molding a metal pipe into a bellows-like shape in such a manner that it can be expanded, compressed and deformed.

(3) In the embodiment described above, the pipe of the main shield portion and connecting pipe are welded together in such a manner that the end faces of them are butted against each other. However, according to the invention, the two pipes may also be welded together in such a manner that one pipe is fitted with the outer surface of the other pipe.

(4) In the embodiment described above, the sub-shield portion is connected to the inverter unit. However, according to the invention, the sub-shield portion can also be connected to the motor.

(5) In the embodiment described above, the major area of the main shield portion is formed so as to have a circular section except for the end portion thereof. However, according to the invention, the major area of the main shield portion may also be formed so as to have another section shape such as an elliptic section or a square shape.

(6) In the embodiment described above, the connecting pipe is formed so as to have a circular section. However, according to the invention, the connecting pipe may also be formed so as to have another section shape such as an elliptic section shape or a square section shape.

(7) In the embodiment described above, the tube-shaped braided member is connected through the connecting pipe to the main shield portion. However, according to the invention, tube-shaped braided member may be connected directly to the main shield portion.

(8) In the embodiment described above, description has been given of a case in which the wire harness is used for connecting together the inverter unit and motor of an electric vehicle. However, the invention can also be applied to a wire harness which is arranged between other pieces of equipment.

According to the invention, since the main shield portion is composed of a metal-made pipe, it not only can fulfill a shielding function but also can positively protect the wires from object such as bounced stones. Further, because the main shield portion, which constitutes a major part of the shielding member, serves also as member to protect the wires, the number of parts can be reduced when compared with a wire harness which uses protecting members in addition to the shielding member. Since the main shield portion is made of a metal pipe, if the two ends of the main shield portion are fixed directly to the shield case, there can be generated stresses in the fixed portions due to vibrations or the like. However, because the sub-shield portion is deformable and thus can absorb the vibrations, actually, there can be prevented occurrence of the stresses in the fixed portions of the main shield portion to the shield case.

According to the invention, since the tube-shaped braided member is made of metal thin lines braided together, it can be deformed flexibly. Therefore, the tube-shaped braided member is able to cope with a case in which the wires are bent with large curvature in the neighboring portion of the equipment.

The metal thin lines are easy to fray out in the end portions of the tub-shaped braided member. However, according to the invention, since, in a state before the tube-shaped braided member is connected to the main shield portion and shield case, the end portions of the tube-shaped braided member are fixed to the connecting pipe and shield shell, the metal thin lines in the end portions of the tube-shaped braided member can be prevented from fraying out.

Since the tube-shaped braided member is made of metal thin lines, the contact area between the tube-shaped braided member and the connecting pipe is relatively small and thus the contact reliability of each other may be lowered. However, according to the invention, since the plating treatment for reduction of the contact resistance of the connecting pipe with respect to the tube-shaped braided member is enforced on the connecting pipe, there can be obtained high contact reliability. Also, the plating treatment may be enforced only on the connecting pipe to be contacted with the tube-shaped braided member and no plating treatment is required on the long main shield portion, thereby being able to reduce the cost of the wire harness.

According to the invention, since the drain hole can discharge the water collecting in the interior of the shielding member, there can be positively prevented an unfavorable phenomenon such as corrosion caused by the presence of water.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A shielded wire harness comprising:
   a plurality of wires;
   a plurality of wire-side terminals respectively connected to end portions of the wires, and configured to be connected to respective terminals disposed within a shield case of an equipment; and
   a shielding member formed in a tube shape and configured to enclose the plurality of wires collectively and to be connected to the shield case,
   wherein the shielding member comprises a main shield portion made of a substantially rigid metal pipe, and a sub-shield portion formed shorter than the main shield portion and configured to be deformable.

2. The shielded wire harness as claimed in claim 1, wherein the sub-shield portion comprises a braided member formed in a tube shape by braided metal thin lines.

3. The shielded wire harness as claimed in claim 2, wherein the shielding member further comprises:
   a connecting pipe made of metal and connected to the main shield portion; and
   a shield shell having a conductive characteristic and configured to be connected to the shield case,
   wherein one end portion of the braided member is connected to the connecting pipe, and the other end portion of the braided member is connected to the shield shell.

4. The shielded wire harness as claimed in claim 3, wherein the connecting pipe is being plated.

5. The shielded wire harness as claimed in claim 1, wherein the shielding member further comprises a drain hole.

6. The shielded wire harness as claimed in claim 5, wherein the drain hole is formed at the lower most position of a wiring route of the shielded wire harness and opened in substantially downward direction.

* * * * *